April 20, 1954 E. G. GOEHLE 2,675,603
COMPOSITE CIRCULAR SAW
Filed April 23, 1952

INVENTOR.
Earl G. Goehle.
BY
Harness, Dickey & Pierce
ATTORNEYS.

Patented Apr. 20, 1954

2,675,603

UNITED STATES PATENT OFFICE 2,675,603

COMPOSITE CIRCULAR SAW

Earl G. Goehle, Royal Oak, Mich.

Application April 23, 1952, Serial No. 283,850

1 Claim. (Cl. 29—95)

The present invention relates to improvements in composite or tipped circular slitting saws.

Prior to the present invention, one of the needs in certain manufacturing processes has been for efficient and uniform production slitting of machine parts to extreme precision limits. The need has been for a thin saw so that a plurality of narrow slots can be cut to substantial depths and precisely spaced with respect to each other. For example, the cutting of slots in typewriter type bar segments has presented a difficult problem in that it has been difficult to hold each slot to the precision required for production assembly, with the result that the striker arms have had to be selectively fitted in each slot. Heretofore, the life of the saws used has been limited.

One of the primary objects of the present invention is to provide an improved composite circular slitting saw which has a long life for the precision slitting of narrow slots in machine parts.

Another object of the present invention is to provide an improved saw of the type mentioned which may be economically produced and in which the cutting elements are so disposed as to provide an economical way of forming the cutting edges thereon.

Other objects of the invention will become apparent from the following specification, the drawing relating thereto, and from the claim hereinafter set forth.

In the drawing in which like numerals are used to designate like parts in the several views throughout:

Figure 1:
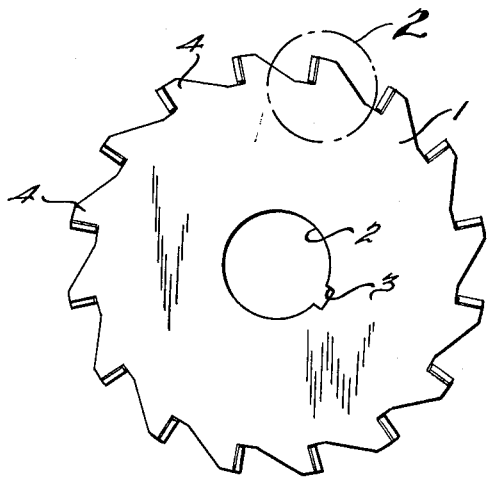
Figure 1 is a side elevational view of a finished slitting saw embodying features of the present invention.

Referring to the drawing, a circular saw is provided which comprises a flat metal disc 1 which is relatively thin and which is provided with a centrally located mounting hole 2 therein. A keyway 3 may be provided in the hole 2 for mounting the saw on the spindle. The disc 1 is formed with a plurality of projections 4 spaced around the periphery thereof and such projections 4 have leading edges 5 which are substantially radial to the center of the saw. The ends of the projections are provided with lands 6 terminating in inwardly slanting edges 7 which join with a rearwardly directed base 8. The lands 6 may be formed with the required clearance angle.

Figure 2:
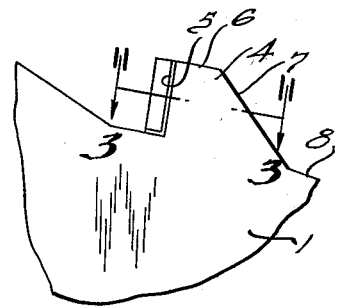
Fig. 2 is an enlarged, partial elevational view of that portion of the saw shown within the circle 2 of Fig. 1.
Figure 3:
Fig. 3 is a cross sectional view taken substantially along the line 3—3 of Fig. 2.
Figure 4:
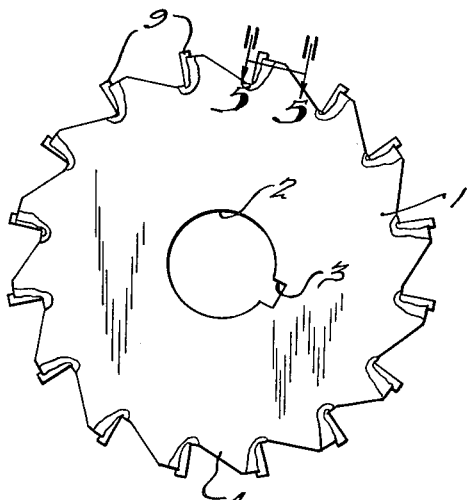
Fig. 4 is a view similar to Fig. 1 of the saw blank prior to the formation of the cutting edges on the tungsten carbide elements.
Figure 5:
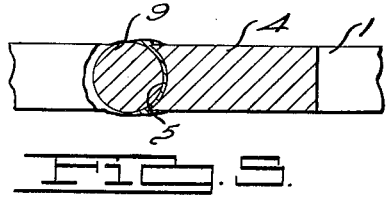
Fig. 5 is an enlarged cross sectional view taken substantially along the line 5—5 of Fig. 4.

The leading edge 5 is curved or concave throughout its depth as indicated in Figs. 2 and 3, and provides a curved seat for the cylindrical element which is disposed therein. Preferably the seat should be on an arc of about 140°. Preferably the cylindrical element is one of the carbides, such as tungsten-carbide, tantalum-carbide, titanium-carbide, columbium-carbide, but within the broader aspects of the invention may be of a high speed steel, either cast or rolled, or other metal having better cutting characteristics than the disc 1. Referring to Figs. 4 and 5, the blank is formed by inserting cylindrical, tungsten carbide elements 9 against the curved leading edges 5. With the tungsten carbide elements assembled in the relationship indicated, they are then brazed to the metal disc 1 with silver solder by well known brazing methods. The tungsten carbide elements 9 have diameters greater than the thickness of the disc 1 as shown in Fig. 5 and are disposed throughout the depth of the faces 5. The elements 9 preferably project slightly beyond the peripheral edge of the projections 4.

The tungsten carbide elements 9 are thus firmly secured to the disc 1, the curvature of the edge 5 substantially conforming to the curvature of the cylindrical surface of the tungsten carbide element 9. The sides, top and leading face of the tungsten carbide elements are then faced off to the form shown in Figs. 1, 2, and 3 to provide the cutting edges on the tungsten carbide elements. In certain cases where extreme accuracy in the entire saw is required, the faces of the disc 1 may also be faced to the accurate thickness required.

The curved seat 5 gives extra mechanical strength in that the insert is supported against side thrust by metal of the pocket itself as well as by the brazed bond itself. It is also pointed out that there is no protruding hub so that close line or multiple cuts are possible.

Formal changes may be made in the specific embodiment of the invention described without departing from the spirit of the invention, the scope of which is commensurate with the appended claim.

What is claimed is:

A composite circular saw comprising a flat metal disc having integral projections spaced around the periphery thereof, said projections each having the leading edge thereof substantially radial and each leading edge being curved in transverse section to provide a curved pocket throughout their depth, and a cutting element of a metal harder than said disc having a curved edge disposed in each of said pockets throughout their depth and permanently brazed thereto.

References Cited in the file of this patent

UNITED STATES PATENTS

| Number | Name | Date |
|---|---|---|
| 1,348,279 | Heywood | Aug. 3, 1920 |
| 1,376,438 | Huther | May 3, 1921 |
| 1,887,373 | Emmons et al. | Nov. 8, 1932 |
| 2,318,549 | Wilkie | May 4, 1943 |
| 2,411,784 | Goldsmith | Nov. 26, 1946 |
| 2,528,226 | Hildebrant | Oct. 31, 1950 |
| 2,600,272 | Segal | June 10, 1952 |